(12) United States Patent
Afanasiev

(10) Patent No.: US 12,348,015 B1
(45) Date of Patent: Jul. 1, 2025

(54) PROFILE SYSTEM FOR LAYING POWER AND COMMUNICATION LINES

(71) Applicant: Vladimir Afanasiev, Woodburn, OR (US)

(72) Inventor: Vladimir Afanasiev, Woodburn, OR (US)

(*) Notice: Subject to any disclaimer, the term of this patent is extended or adjusted under 35 U.S.C. 154(b) by 0 days.

(21) Appl. No.: 19/089,270

(22) Filed: Mar. 25, 2025

(51) Int. Cl.
*H02G 3/00* (2006.01)
*H02G 3/04* (2006.01)

(52) U.S. Cl.
CPC .................. *H02G 3/0437* (2013.01)

(58) Field of Classification Search
CPC .................................... H02G 3/0437
See application file for complete search history.

(56) References Cited

U.S. PATENT DOCUMENTS

| 12,300,983 | B2* | 5/2025 | Ji | B60R 16/027 |
| 2022/0060147 | A1* | 2/2022 | Gladkin | H02S 40/36 |
| 2023/0189468 | A1* | 6/2023 | Anderson | G02B 6/4452 385/136 |

* cited by examiner

*Primary Examiner* — Pete T Lee
(74) *Attorney, Agent, or Firm* — Nadya Reingand

(57) ABSTRACT

A profile system for laying power and communication cables is proposed, which comprises a guide profile housing accommodating a permanently fixed cable harness of insulated linear cables. Cable holders secure the harness at intervals and function as socket-and-plug connectors for additional devices. The profile housing includes a base having openings at both ends for integrating switching cable assemblies with various connectors and a decorative cover. The cable holders are recesses that match the cables' size and number and are made in lower parts of switching housings of both the additional devices and the cable harness. Switching cable assemblies pass through the openings into the lower parts of the switching housings. Upper switching housing parts of both the additional devices and the cable harness, which are attached to their lower counterparts, contain cut-in contacts and upper switching housing parts of the additional devices contain control microcircuits.

13 Claims, 2 Drawing Sheets

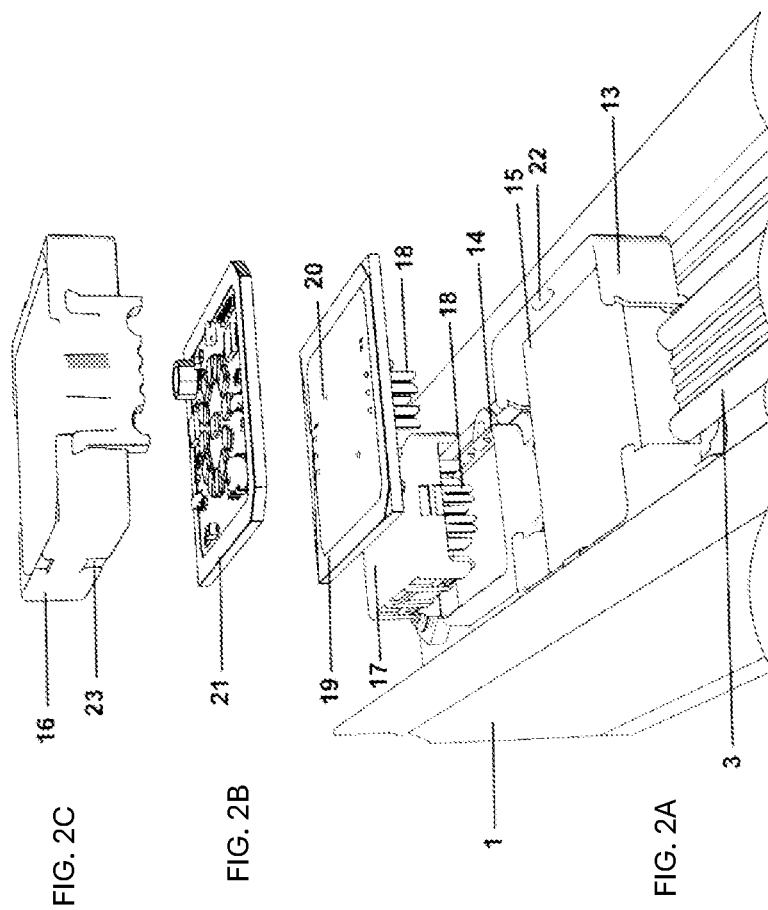

PROFILE SYSTEM FOR LAYING POWER AND COMMUNICATION LINES

TECHNICAL FIELD

The invention relates to the field of electrical engineering, namely to power transmission and communication lines, and can be used in laying cable routes for various purposes (lighting, video surveillance, etc.).

BACKGROUND OF THE INVENTION

RU 185886 (IPC E04F 13/00, F21V 33/00, published 21 Dec. 2018) discloses a facade structure with integrated LED light sources, consisting of panels and a frame in the form of vertical posts and horizontal ledgers which are closed with profile covers. At the intersection of the profile covers, there are holes for cables of lighting equipment. In the frontal planes of the profile covers, there are holes for light sources that are comparable to the diameter of the light sources.

CA 1329636 (IPC H01R 25/14, F21V 21/35, F21V 23/06, published 17 May 1994) discloses a lighting system comprising: a channel element having guide means and a C-shaped cross-section with an opening; a flexible cable having a plurality of insulated conductors therein, said cable being retained within said channel member; a first connector member having means thereon for slidably engaging said guide means and other means for attachment to an electrical fixture; a second connector member having barb means for piercing the insulation of at least some of said conductors of said cable through the opening of said channel member, and electrical connection means for connection to the electrical fixture. The first and second connector members being configured for coacting engagement for urging said barb means through the insulation of said at least some of said conductors and for retaining said socoacted connector members in fixed relation relative to said channel member.

EP 2568552 (IPC H02G 3/04, H02G 3/06, published 13 Mar. 2013) discloses a cable holding device made of metal and comprising: two side spars form an edge round a cable-retaining part, and a base unit connecting the side spars. The cable holding device comprises, at its ends, a connecting section for connecting a first cable-carrying device to a second cable-carrying device with one or more mechanical linking elements and at least one electrical connecting element. The cable holding device comprises, in the area of its connecting sections, one or more plug-in connecting parts for creating one or more electrical connectors when one cable holding device is connected to another to create a cable routing system. At least one electrical connector ensures the creation of an electrical connection with a constantly defined contact surface and a defined contact pressure when connecting two cable holding devices. The parts of the electrical connector of the two connected cable holding devices are designed so as to be mutually complementary, such that the electrical connection is carried out immediately when the two devices are connected. In addition, a spring element in the form of a clamp, which is held in the connecting section of the cable holding device, is provided for applying the contact pressure of the two assembled parts of the connector.

EP 0486714 (IPC F21V 21/02, F21V 23/06, published 27 May 1992) discloses a light track system consisting of a mounting rail, in which through-wiring is laid in the mounting rail in the manner of a conductor rail from insulated conducting wires, which are arranged at a close spacing next to one another and are fixed in extension of the mounting rail in freely selectable sections in cable holders attached to the mounting rail. The insulated conducting wires have a bared wire section inside the cable holders, so that the cable holders simultaneously enable the function of a socket-contact, to which on the side of the basic battens plugs having resilient contact elements are assigned.

The common disadvantages of the known devices and systems for laying electrical wiring are:
- low moisture protection of cable lines;
- low electrical protection, which increases both the general danger at facilities using such systems and the repair time required to restore the operating mode when they fail;
- limited functionality associated with solving specific problems, without the possibility of unification and integration of power elements and control elements.

SUMMARY OF THE INVENTION

The technical problem solved by the claimed technical solution is to eliminate the above-indicated disadvantages, and the technical result achieved when solving the technical problem is an improvement of the technical characteristics of a system for laying power and communication cables, in particular, resistance to various types of damage, electrical safety, efficiency of control of the elements included in the system, as well as simplified installation with the possibility of customizing the system for specific design solutions for various functional purposes.

The above-indicated technical result is achieved due to the fact that the profile system for laying power and communication cables comprises a guide profile housing, inside which a cable harness of insulated linear cables located at a close spacing next to one another is permanently laid along the entire length of the cable harness. The cable harness is fixed at certain intervals in cable holders mounted to the profile housing. The cable holders additionally perform a socket-and-plug function for connecting additional devices to the cable harness. The profile housing comprises a base, along the entire length of which the cable harness is laid, and a decorative cover. At opposite ends of the base, there are openings for switching cable assemblies with different types of connectors. The cable holders are recesses corresponding, in size and quantity, to the cables making up the cable harness and made in lower parts of switching housings of the additional devices and switching housings of the cable harness. The lower parts of the switching housings of the additional devices are mounted at certain intervals along the base, and the lower parts of the switching housings of the cable harness are mounted at opposite ends of the base between the opening for the switching cable assembly and the lower part of the switching housing of the additional device that is mounted in close vicinity to the opening. The switching cable assemblies with different types of connectors, which are passed from the corresponding openings, are also fed into the lower parts of the switching housings of the cable harness towards the cable harness, in order to perform the socket-and-plug function. Upper parts of the switching housings of the additional devices and upper parts of the switching housings of the cable harness are attached, respectively, to the lower parts of the switching housings of the additional devices and the lower parts of the switching housings of the cable harness with the cable harness laid therein. Cut-in contacts are provided on the inside of the upper part of the switching housings of the cable harness, and the upper part of the switching housings of the additional devices, which is a cover, comprises a microcircuit for controlling the additional device and a pad provided with a spring-loaded terminal, a blade of the additional device and cut-in contacts.

The claimed invention allows implementing design tasks for various purposes, in particular, various lighting scenarios for outdoor lighting, due to the use of universal elements adaptable to a specific task and included in the said profile system which is both easy to install and retains its electrical and moisture protection characteristics. In addition, due to the integration of control microcircuits, the interaction of the additional devices with an external controller is optimized, and all arising faults can be eliminated locally in a certain area without affecting the operation of other serviceable areas.

The cable harness and cable assemblies include insulated linear power and communication cables.

Depending on a specific design task, the additional devices connected to the cable harness can be lighting elements, speakers, video cameras, lasers, sensors, solar batteries or other devices in the operation of which power and communication cables are involved.

It is advisable to make the base and the decorative cover from an extruded aluminum profile, which simultaneously ensures lightness, rigidity and strength of the structure, allowing it to be mounted on building facades. For a tighter fit of the decorative cover at the point where it connects to the base, a silicone seal is placed in side grooves made along the inner side of the decorative cover.

To improve the reliability of fixing the elements in the system, the lower parts of the switching housings for the additional devices and the switching housings of the cable harnesses are fixed on two opposite sides with self-tapping screws in the side grooves made along the entire length of the inner side of the base, and the upper and lower parts of the switching housings are fastened to each other using a tongue-and-groove connection.

The lower parts of the switching housings of the additional devices and the switching housings of the cable harness with the cable harness laid therein are filled with a hydrophobic dielectric gel from above, after hardening of which the upper parts of the switching housings of the additional devices and the upper parts of the switching housings of the cable harness are installed, respectively, which increases the moisture protection and electrical safety of the entire system.

The cut-in contacts located on the upper parts of the switching housings of the additional devices and the upper parts of the switching housings of the cable harnesses can have a U-shape, a trident shape, or another. To prevent short circuits, the cut-in contacts on the upper part of the switching housing of the cable harness are staggered, and the blade of the additional device on the upper part of the switching housing of the additional device is made of or coated on top with a dielectric material.

When using the claimed invention for outdoor lighting, a pixel-type LED spotlight is installed on the upper part of the switching housing of the additional device, and holes are made on the front side of the decorative cover, where a protective lens-diffuser is attached with tape to protect the lighting elements and adjust the direction of light propagation.

BRIEF DESCRIPTION OF DRAWINGS

The present invention will be further described with reference to the accompanying drawings, wherein:

FIG. 2A is a close-up view of the base of the profile housing with the cable harness laid therein and fixed in the switching housing of an additional device and in the switching housing of the cable harness;

FIG. 2B is a control microcircuit;

FIG. 2C is an upper part of the switching housing of the additional device.

Figure 1B:
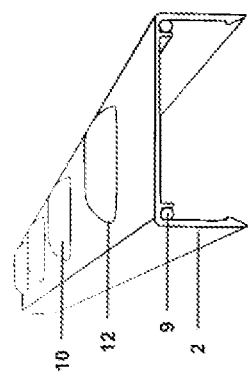
FIG. 1B is a decorative cover with attached protective lens-diffuser, in accordance with at least one aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE INVENTION

In the following Detailed Description, reference is made to the accompanying drawings, which form a part hereof, and in which is shown by way of illustration specific embodiments in which the invention may be practiced. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The claimed invention is illustrated in FIGS. 1-2 using the following designations:

1—base;
2—decorative cover;
3—cable harness;
4—opening for a switching cable assembly;
5—switching housing of an additional device;
6—switching housing of the cable harness;
7—system of power and switching cables;
8—nut;
9—seal;
10—protective lens-diffuser;
11—groove;
12—opening;
13—lower part of the switching housing of the additional device;
14—lower part of the switching housing of the cable harness;
15—hydrophobic dielectric gel;
16—upper part of the switching housing of the additional device;
17—upper part of the switching housing of the cable harness;
18—cut-in contact;
19—pad;
20—spring-loaded terminal;
21—control microcircuit;

22—protrusion;
23—groove.

Figure 1A:
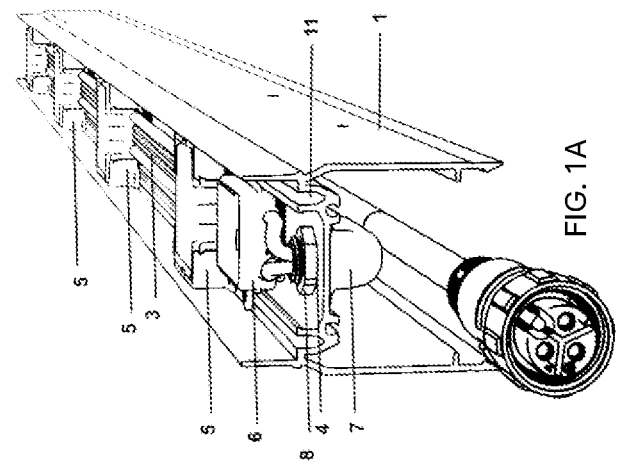
FIG. 1A is an isometric view of a base of a profile housing with a cable harness laid therein and fixed in a switching housings of an additional devices and in a switching housings of the cable harness.

A profile system for laying power and communication cables includes a guide profile housing comprising a base 1 (FIG. 1A), along the entire length of which a cable harness 3 is laid, and a decorative cover 2 (FIG. 1B). In accordance with a specific design solution, the length of the profile housing and the cable harness 3 laid therein, as well as the number of switching housings 5 of additional devices and a certain distance therebetween are selected. At opposite ends of the base 1, openings 4 are made for passing switching cable assemblies, where power and communication cable systems 7 are mounted with different types of connectors, being fixed with a nut 8. Next to the openings 4, further away from the ends of the base 1, are switching housings 6 of the cable harness.

Along the base 1 (FIG. 2A), between the openings 4 for the switching cable assemblies at certain distances from each other in accordance with a specific design solution, lower parts 13 of the switching housings of the additional devices are mounted. At the opposite ends of the base 1, between the opening 4 for the switching cable assembly and the lower part 13 of the switching housing of the additional device that is mounted in close proximity to the opening 4, lower parts 14 of the switching housings of the cable harness are installed. In this case, the lower parts 13 of the switching housings of the additional devices and the switching housings 14 of the cable harness are secured from two opposite sides with self-tapping screws in side grooves 11 made along the entire length of the inner side of the base 1.

The cable harness 3 of insulated linear power and communication cables located at a close spacing next to one another is laid along the base 1 and fixed in recesses made on the bottom of the lower parts 13 of the switching housings of the additional devices and the lower parts 14 of the switching housings of the cable harness, with the recesses corresponding in size and quantity to the cables making up the harness. The power and communication cable systems 7 coming out of the openings 4 for the switching cable assemblies are fed into the lower parts 14 of the switching housings of the cable harness from the side of the ends of the base 1. Thus, in the lower parts 14 of the switching housings of the cable harness, the cable harness 3 and the power and communication cable system 7 are located facing each other.

The lower parts 13 of the switching housings of the additional devices and the lower parts 14 of the switching housings of the cable harness with the cable harness 3 laid therein are filled with a hydrophobic dielectric gel 15 on top, after hardening of which upper parts 16 of the switching housings of the additional devices with projections 22 inserted into corresponding grooves 23 and upper parts of the switching housings 17 of the cable harness are installed, respectively. Moreover, there are cut-in contacts 18 on the inner side of the upper part 17 of the switching housing of the cable harness, and the upper part 16 of the switching housing of the additional device (FIG. 2C), which is a cover, comprises a control microcircuit 21 (FIG. 2B) closed by a pad 19 with a spring-loaded terminal 20, a blade of the additional device and the cut-in contacts 18. In this case, the control microcircuit 21 contains a chip of one of the following additional devices: a lighting element, a speaker, a video camera, a laser, a sensor, a solar battery or another device, mounted on the upper part 16 of the switching housing of the additional device, and the spring-loaded terminal 20 ensures the supply of energy and control signals to the additional device.

After laying a silicone seal 9 in the side grooves located along the entire length of the inner side of the decorative cover 2, the decorative cover 2 and the base 1 are connected to each other. Before installing the system, end caps with gaskets are installed on the sides of the profile housing.

In a particular embodiment (FIG. 1B), when using the claimed invention for outdoor lighting in accordance with a specific design solution, openings 12 are made on the front side of the decorative cover 2, corresponding in size and shape to the lighting elements. A protective lens-diffuser 10 is mounted with tape in each made opening 12. In this case, a pixel-type LED lamp is installed as a lighting element on the upper part 16 of the switching housing of the additional device.

The claimed invention can find application in the following areas:
- in urban infrastructure for organizing outdoor lighting (lighting elements with uniform illumination or moving effects), video surveillance (surveillance cameras) and sound notifications (speakers for transmitting various messages);
- in industry for automation of production processes (connection of temperature, vibration and other parameter sensors to determine the state of equipment), ensuring security (laser pointers and light projections to designate zones or evacuation routes, surveillance cameras, speakers for voice commands of personnel) and organizing lighting in industrial zones and production facilities (spot lighting of workplaces, warehouse lighting);
- in residential and commercial construction for the integration of various engineering solutions (lighting of store windows, creation of mobile systems in conference rooms, decorative lighting of facades and interior spaces, projection of images or decorative elements using lasers, integration of climate and security control systems, control of the "smart home" system);
- in transport for organizing lighting (platform and station lighting, tunnel lighting, pavilion lighting and installation of information boards, decorative lighting of terminal facades) and ensuring security (surveillance cameras for passenger flow, connection of emergency speakers);
- in agriculture for automation and process control (connection of lighting elements to control the photoperiod of plants, installation of temperature, humidity and illumination sensors, video surveillance of a farm condition);
- other (installation of lighting elements for stage lighting, laser installations for light shows, simultaneous connection of output systems, projectors, screens and sound equipment).

The invention claimed is:

1. A profile system for laying power and communication cables, comprising:
   a guide profile housing, inside which a cable harness of insulated linear cables located at a close spacing next to one another is permanently laid along an entire length of the cable harness;
   wherein the cable harness is fixed at certain intervals in cable holders mounted to the profile housing;
   wherein the cable holders additionally perform a socket-and-plug function for connecting additional devices to the cable harness;
   wherein the profile housing comprises:
   a base, the cable harness being laid along an entire length of the base; and
   a decorative cover;

wherein, at opposite ends of the base, there are openings for switching cable assemblies with different types of connectors;

wherein the cable holders are recesses corresponding, in size and quantity, to the cables making up the cable harness and made in lower parts of switching housings of the additional devices and switching housings of the cable harness;

wherein the lower parts of the switching housings of the additional devices are mounted at certain intervals along the base, and the lower parts of the switching housings of the cable harness are mounted at opposite ends of the base between the opening for the switching cable assembly and the lower part of the switching housing of the additional device that is mounted in close vicinity to the opening;

wherein the switching cable assemblies with different types of connectors, which are passed from the corresponding openings, are also fed into the lower parts of the switching housings of the cable harness towards the cable harness, in order to perform the socket-and-plug function;

wherein upper parts of the switching housings of the additional devices and upper parts of the switching housings of the cable harness are attached, respectively, to the lower parts of the switching housings of the additional devices and the lower parts of the switching housings of the cable harness with the cable harness laid therein;

wherein cut-in contacts are provided on an inner side of the upper part of the switching housings of the cable harness, and the upper part of the switching housings of the additional devices, which is a cover, comprises a microcircuit for controlling the additional device and a pad provided with a spring-loaded terminal, a blade of the additional device and cut-in contacts.

2. The system of claim 1, wherein the cable harness and the cable assemblies include insulated linear power and communication cables.

3. The system of claim 1, wherein the additional devices comprise lighting elements, speakers, video cameras, lasers, sensors, solar batteries or other devices whose operation is based on power and communication cables.

4. The system of claim 1, wherein the base and the decorative cover are made of an extruded aluminum profile.

5. The system of claim 1, wherein, along an inner side of the decorative cover, there are side grooves for laying a silicone seal.

6. The system of claim 1, wherein the lower parts of the switching housings of the additional devices and the switching housings of the cable harnesses are fixed on two opposite sides with self-tapping screws in side grooves made along the entire length of an inner side of the base.

7. The system of claim 1, wherein the upper and lower parts of the switching housings of the additional devices and the upper and lower parts of the switching housings of the cable harness are fastened to each other using a tongue-and-groove connection.

8. The system of claim 1, wherein the lower parts of the switching housings of the additional devices and the lower parts of the switching housings of the cable harness with the cable harness laid therein are filled with a hydrophobic dielectric gel from above, after hardening of which the upper parts of the switching housings of the additional devices and the upper parts of the switching housings of the cable harness are installed, respectively.

9. The system of claim 1, wherein the cut-in contacts have a U-shape, a trident shape, or another.

10. The system of claim 1, wherein the cut-in contacts on the upper part of the switching housing of the cable harness are staggered.

11. The system of claim 1, wherein the blade of the additional device is made of or coated on top with a dielectric material.

12. The system of claim 1, wherein a pixel-type LED spotlight is located on top of the switching housing of the additional device.

13. The system of claim 1, wherein the decorative cover has a front side having holes in which a protective lens-diffuser is attached with tape.

* * * * *